United States Patent [19]
Ito et al.

[11] 4,108,123
[45] Aug. 22, 1978

[54] CARBURETOR

[75] Inventors: Ryozo Ito, Toyota; Akira Tokuda, Oobu, both of Japan

[73] Assignees: Toyota Jidosha Kogyo Kabushiki Kaisha, Toyoto; Aisan Kogyo Kabushiki Kaisha, Oobu, both of Japan

[21] Appl. No.: 782,345

[22] Filed: Mar. 29, 1977

[30] Foreign Application Priority Data

Jul. 30, 1976 [JP] Japan .................................. 51-91638
Jul. 30, 1976 [JP] Japan .................................. 51-91639

[51] Int. Cl.² ........................................... F02B 33/00
[52] U.S. Cl. ..................... 123/119 EC; 123/119 R; 123/127; 123/179 G; 261/39 D; 261/41 D
[58] Field of Search ............ 123/119 EC, 119 R, 127, 123/179 G, 32 EA, 32 AE; 261/41 D, 39 D, DIG. 74

[56] References Cited

U.S. PATENT DOCUMENTS

| | | | |
|---|---|---|---|
| 2,252,120 | 8/1941 | Ericson | 123/119 EC |
| 3,693,947 | 9/1972 | Masaki | 261/39 D |

*Primary Examiner*—Ronald H. Lazarus
*Attorney, Agent, or Firm*—Stevens, Davis, Miller & Mosher

[57] ABSTRACT

A carburetor for use with a stratified charge rotary piston engine including a first supply system having a main fuel supply system and a slow/idle fuel supply system and adapted to supply a fuel-air mixture and a second supply system adapted to supply only air, wherein a second slow/idle supply system is provided to supply an additional fuel when an engine is operating in a slow speed or idling condition and/or the exhaust gas temperature of the engine is below a predetermined value.

7 Claims, 3 Drawing Figures

CARBURETOR

BACKGROUND OF THE INVENTION

1. Field of the Invention

The present invention relates to a carburetor and, more particularly, an improvement of a carburetor for use with stratified-charged rotary piston engine with regard to the overall air/fuel ratio performance thereof for effecting a stabilized low speed and low load operation of the engine had a better purification of exhaust gasses.

2. Description of the Prior Art

In the Wankel type rotary piston engine which comprises a casing composed of a rotor housing having a trochoidal inner peripheral surface and side housings which close the opposite ends of the rotor housing, an eccentric shaft, and a polygonal rotor adapted to eccentrically rotate around said eccentric shaft with apex portions thereof sliding over said trochoidal inner peripheral surface, the flame in the combustion chamber initiated by the ignition plug generally propagates very rapidly toward the leading side of the combustion chamber as seen in the rotational direction of the rotor due to a flow of fuel-air mixture generated by the rotation of the rotor, whereas the flame is hard to propagate toward the opposite trailing side of the combustion chamber. Because of this, the fuel-air mixture existing in the trailing region of the combustion chamber is prone to imperfect combustion thereby causing poor fuel comsumption, simultaneously increasing the emission of harmful uncombusted components such as HC and CO.

In order to solve these problems, there has been proposed a new type of stratified-charged rotary piston engine having a first intake port formed as a peripheral port which opens in the trochoidal inner peripheral surface of the rotor housing and a second intake port preferably formed as a side intake port which opens in the flat inside surface of the side housing at a position advanced from said first intake port as seen in the rotational direction of the rotor. The first intake port supplies a relatively rich fuel-air mixture whereas said second port supplies only air thereby ultimately providing a stratified charge in the combustion chamber of the engine in a manner such that the leading side of the combustion chamber is charged with a relatively rich fuel-air mixture while the trailing side thereof is charged substantially with air. This pattern of stratified charging facilities complete combustion of fuel in the combustion chamber and provides an advantage that a higher overall air/fuel ratio can be employed thereby improving the fuel consumption and reducing the emission of harmful uncombusted components. In this connection, there has been proposed a new type of carburetor for use with a stratified-charged rotary piston engine of the aforementioned type, said carburetor comprising a first supply system adapted to supply fuel-air mixture and a second supply system adapted to supply only air, said two supply systems having individual throttle valves operationally co-related with each other to control the total supply of air to the engine. In this case, it has also been proposed to incorporate a special timing mechanism into the linkage co-relating the two throttle valves so that the opening phase of the throttle valve in said second supply system is somewhat delayed from that of the throttle valve in said first supply system, thereby effecting a temporary supply of a richer fuel-air mixture during acceleration of the engine to provide better accelerating performance.

Although a stratified-charge rotary piston engine of the aforementioned type is capable of operating satisfactorily at a normal speed and load operating condition, it still has the problem that operation at a low speed and low load condition (performed by a very small supply of fuel) is prone to become unstable. Furthermore, in a low speed and load operation or idling operation, the exhaust gas temperature substantially lowers and causes a problem that a reactor for purifying uncombusted components such as HC and CO is not maintained in a hot condition required for performing its purification process, thereby causing poor purification efficiency.

SUMMARY OF THE INVENTION

It is therefore an object of the present invention to deal with the aforementioned problems and to provide an improved carburetor for use with a stratified-charged rotary piston engine of the aforementioned particular type.

In accordance with the present invention, the above-mentioned object is accomplished by a carburetor for use with a stratified-charged rotary piston engine, comprising a first supply system having an air-flow passage, a throttle valve, main fuel supply system and a slow/idle fuel supply system, and a second supply system having an air flow passage and a throttle valve which is operationally co-related with said throttle valve in said first supply system. The improvement comprises a second slow/idle fuel supply system provided in one of said first and second supply systems, said second slow/idle fuel supply system having a control valve which selectively intercepts the flow of fuel through said second slow/idle fuel supply system, a first sensing means for sensing the speed condition of the engine, a second sensing means for sensing the temperature condition of the exhaust gas of the engine, and a control means for controlling said control valve depending upon the information received from said first and second sensing means in a manner such that the flow of fuel through said second slow/idle fuel supply system is intercepted when the engine speed is above a predetermined slow level and the exhaust gas temperature is above a predetermined value.

By employing a carburetor of the above-mentioned construction, the engine is supplied with an additional amount of fuel through said second slow/idle fuel supply system when it is in a slow or idle operating condition or when the exhaust gas temperature is below a predetermined value, whereby when either one of these two conditions is encountered, the engine is operated with a temporary enrichment of fuel-air mixture thereby ensuring a stable operation of the engine as well as a high purifying efficiency of the reactor means.

BRIEF DESCRIPTION OF THE DRAWING

In the accompanying drawing.

DESCRIPTION OF THE PREFERRED EMBODIMENT

In the following the invention will be described in more detail with respect to some preferred embodiments thereof with reference to the accompanying drawings.

Figure 1:
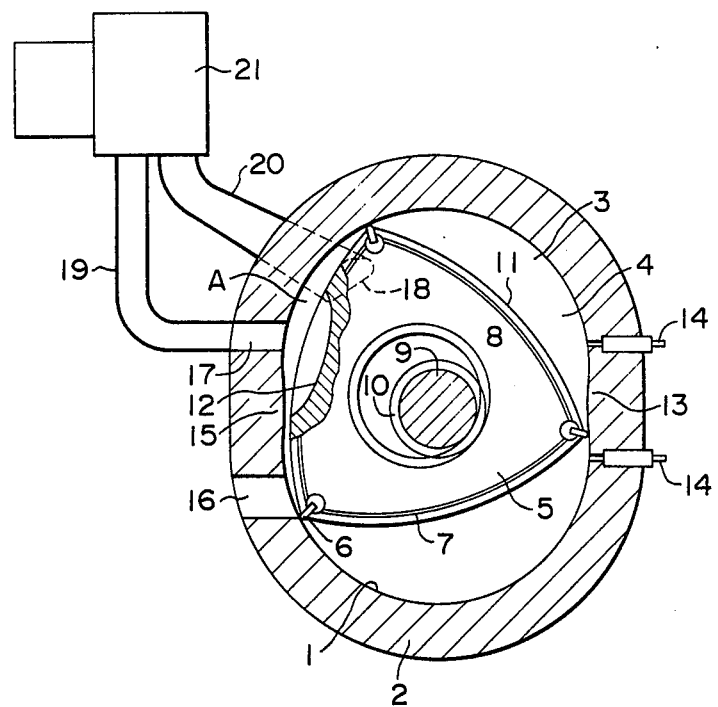
FIG. 1 is a diagrammatical sectional view of a rotary piston engine of a particular stratified-charged type for which the carburetor of the present invention is used.

Referring first to FIG. 1 showing a particular stratified rotary piston engine for which the carburetor of the present invention is used, the engine comprises a rotor housing 2 having a trochoidal inner peripheral surface 1, the opposite open ends thereof being closed by side housings 4 each having a flat inside surface 3, thus forming an engine casing in which is mounted a triangular rotor 5 to eccentrically rotate around an eccentric shaft 9 while apex seals 6 provided at apex portions of the rotor slide over the trochoidal inner peripheral surface 1, side seals 7 provided in the side walls of the rotor sliding over the flat inside surfaces 3 of the side housing and an internal gear 8 of the rotor meshing with a fixed gear 10 provided in side housing 4. The three flanks 11 of the rotor 5 are individually provided with recesses 12. In one short axis portion 13 of the rotor housing are spark plugs 14, while in the other short axis portion 15 are provided an exhaust port 16 formed as a peripheral port and an intake port 17 also formed as a peripheral port. Spaced from the peripheral intake port 17 in the rotating direction of the rotor is another intake port 18 formed as a side port which opens in the inside surface of the side housing 4. The peripheral intake port 17 and the side intake port 18 are connected with a carburetor 21 by means of intake tubes 19 and 20, respectively. In this type of stratified charge rotary piston engine, a fuel-air mixture is supplied from the port 17 and is first charged in the combustion chamber such as shown by A defined by the trochoidal inner peripheral surface and one of the arcuately curved flanks 11 having the recess 12 and, thereafter, when the side port 18 is traversed by the side seal 7 and is opened, air is supplied from the side port 18. In this case, the initially charged fuel-air mixture is dragged forward in accordance with the rotation of the rotor to principally fill the leading region of the combustion chamber while the air supplied from the side port 18 principally fills the trailing region of the combustion chamber, thereby accomplishing a particular leading-rich, trailing lean stratified-charged condition. This stratified charge is then compressed and is further ignited by the spark plug 14 to proceed to the combustion stroke. As mentioned above, the leading-rich, trailing-lean stratified charge is combusted in a very desirable manner when compared with a uniform charge or a reverse leading-lean, trailing-rich charge due to the particular flame propagation characteristic in the rotary piston engine of this type.

Figure 2:
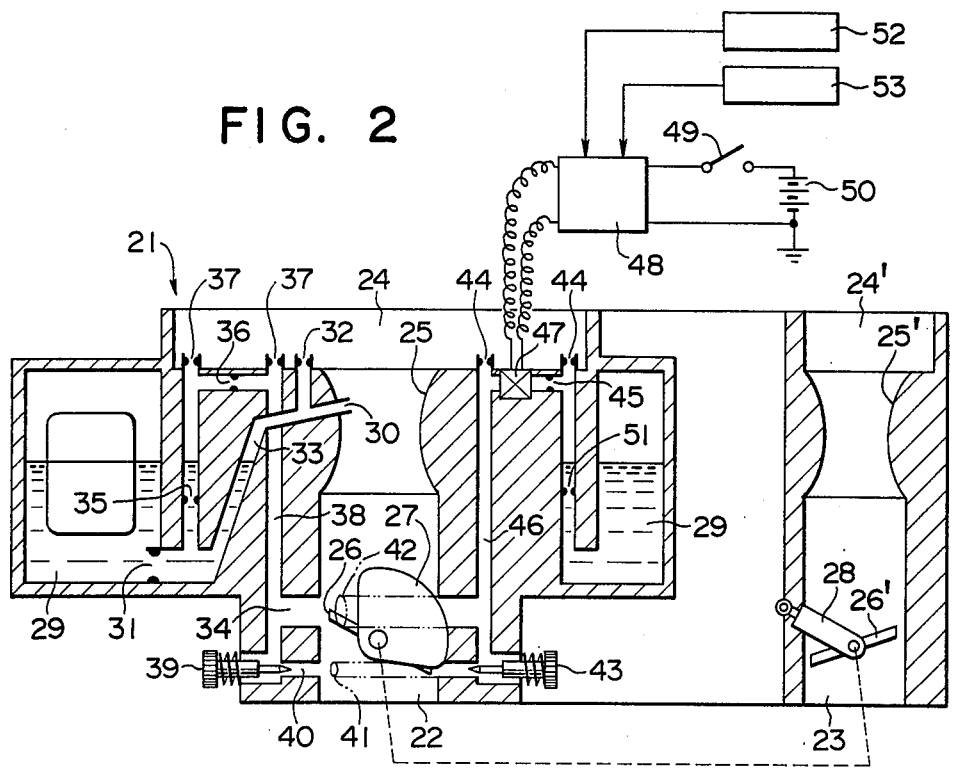
FIG. 2 is a diagrammatical sectional view of an embodiment of the carburetor of the present invention.

FIG. 2 shows an embodiment of the carburetor 21 in which the present invention is incorporated. The carburetor has first and second air flow passages 22 and 23 arranged in parallel with each other, wherein, however, the first air flow passage 22 is incorporated in a fuel-air supply system and is adapted to discharge a fuel-air mixture toward the intake tube 19 connected thereto, whereas the second air flow passage 23 is incorporated in an air supply system and discharges only air toward the intake tube connected thereto. In FIG. 2, the two air flow passages 22 and 23 are shown as substantially spaced from each other for the convenience of illustration, but it is to be understood that these two air flow passages are arranged close to each other in actual carburetors. The passages 22 and 23 have air intake ports 24 and 24' and venturi portions 25 and 25', respectively, and are controlled by throttle valves 26 and 26', respectively. The throttle valve 26 is connected with a cam 27 while the throttle valve 26' is connected with a lever 28 which operates as a cam follower engaged with the cam 27, thereby co-relating the operation of the throttle valve 26' to that of the throttle valve 26. The first supply system including the air flow passage 22 further comprises a float chamber 29 which supplies fuel to a main nozzle 30 opening in the throat of the venturi 25 through a main fuel passage 33 including a main jet 31 and an air bleed 32. The carburetor further comprises a conventional slow/idle fuel supply system including a slow port 34 which opens to closely oppose the throttle valve 26, a slow/idle fuel supply passage 38 including a slow jet 35 an economizer jet 36 and two air bleeds 37, and an idle port 40 provided on the downstream side of the slow port 34 and having a fuel adjusting screw 39.

In addition to the above-explained conventional slow/idle fuel supply system, the carburetor of the present invention comprises a second slow/idle fuel supply system having a second idle port 41 provided to open near the first idle port 40 and a second slow port 42 provided to open near the first slow port 34, these second ports being supplied with fuel through a second slow/idle fuel supply passage 46. Here it is to be noted that the illustration of the of the second slow/idle fuel supply system in FIG. 2 is a development of a section which is different from that of the first slow/idle fuel supply system for the convenience of illustration and that in the actual structure the second slow and idle ports 42 and 41 are located near the first slow and idle ports 34 and 40 as mentioned above. Similarly, the passage 46 for supplying fuel to the second slow and idle ports 42 and 41 may be provided close to the fuel passage 38 in the first slow/idle fuel supply system. For the same reason, the right side float chamber 29 which supplies fuel to the second slow/idle fuel supply system in a manner such as explained hereinunder is the same chamber as the left side chamber 29.

The fuel passage 46 includes the similar elements such as provided in the fuel passage 38 of the first slow/idle supply system, such as a slow jet 51, two air bleeds 44, an economizer jet 45 and a fuel adjust screw 43. However, the second slow/idle fuel supply passage 46 further includes a control valve 47 adapted to selectively intercept the passage. The control valve 47 may preferably be a solenoid valve electrically operated by an electronic control means 48 which is powered by the automobile battery by way of the ignition switch 49. The control means 48 receives first information with regard to the speed condition of the engine from a first sensing means 52. The first information may be the opening of the throttle valve 26 when the sensing means 52 is a means adapted to detect the rotational angle of the throttle valve. Alternatively, the first information may be the intake vacuum when the sensing means 52 is a means adapted to measure the intake vacuum. The control means 48 receives second information with regard to the temperature condition of the exhaust gas of the engine from a second sensing means 53 which may be a thermostat adapted to detect whether the exhaust gas temperature of the engine is above or below a predetermined value. Depending upon the information received from the sensing means 52 and 53, the control means 48 controls the operation of the control valve 47 in a manner such that the valve 47 is closed to intercept the flow of fuel through the passage 46 when the engine speed is above a predetermined slow level and the exhaust gas temperature is above a predetermined value. In other words, the valve 47 is opened to permit the flow of fuel therethrough when the engine is in a predetermined slow to idling operation and/or the exhaust gas temperature of the engine is below a predetermined value.

When the engine operates in a medium to high load condition after it has been warmed up, the first supply system including the first air flow passage 22, main nozzle 30, main fuel passage 33, etc. produces a fuel-air mixture and supplies it to the peripheral intake port 17 through the intake tube 19, whereas the second supply system including the second air flow passage 23 supplies only air to the side intake port 18 through the intake tube 20. In this operating condition, a small amount of fuel is also drawn out through the conventional slow/idle fuel supply system including the slow port 34, idle port 40, fuel passage 38, etc. By this continuous operation of the conventional slow/idle fuel supply system, the operation of the engine is smoothly transferred from a middle to high load condition to a slow or idling condition. On the other hand, in this operating condition, the second slow/idle fuel supply system including the idle port 41, slow port 42, fuel passage 46, control valve 47, etc. is shut down by the control valve 47 which intercepts the flow of fuel through the passage 46. Therefore, it is avoided that an excessive amount of fuel is supplied from the second slow/idle fuel supply system.

When the engine operates in a slow or idling condition, the operating condition is detected by the sensing means 52 and the control means 48 actuates to open the control valve 47. In this condition, therefore, the second slow/idle fuel supply system operates and an additional amount of fuel is supplied from this system, thereby temporarily lowering the overall air/fuel ratio so that a stable slow operation or idling operation is ensured.

When the exhaust gas temperature is below a predetermined level, regardless of the speed condition of the engine, though such a low temperature of the exhaust gas generally occurs in a low speed or idling condition, except a cold state of the engine, this is detected by the sensing means 53, whereby the control means 48 opens the control valve 47. In this condition, therefore, an additional amount of fuel is supplied from the second slow/idle fuel supply system to temporarily lower the air/fuel ratio so that the exhaust gas temperature of the engine is maintained above a predetermined value required for ensuring a satisfactory purifying performance of the thermal reactor, especially when a secondary air injection is performed.

Figure 3:
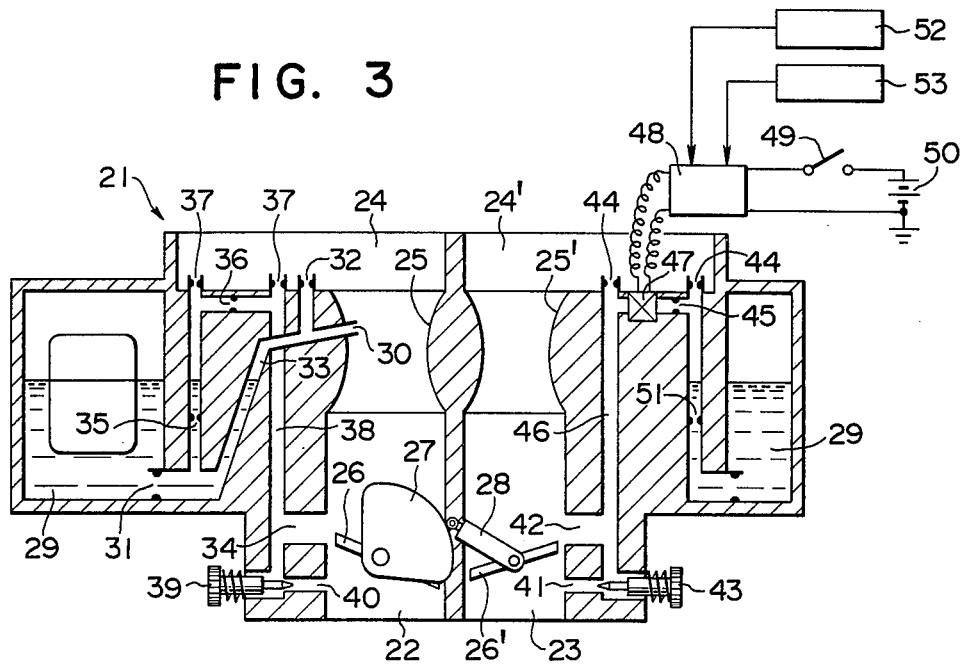
FIG. 3 is a view similar to FIG. 2 showing another embodiment of the invention.

FIG. 3 is a view similar to FIG. 2 showing another embodiment of the present invention. In FIG. 3, the portions corresponding to those shown in FIG. 2 are designated by the same reference numerals. In this embodiment, the second slow/idle fuel supply system is incorporated in the second supply system which is originally constituted to provide only air. In this case, therefore, both the second idle port 41 and the second slow port 42 open to the second air flow passage 23 so as to supply an additional amount of fuel from the side port 18 when the engine is operating in a low speed or idling condition and/or when the exhaust gas temperature of the engine is below a predetermined value. It will also be apppreciated that a supplement of fuel from the side port 18 in those operating conditions has the same effect of temporarily lowering the overall air/fuel ratio and ensures a stable operation of the engine and/or a satisfactory performance of the reactor for purifying exhaust gasses.

Although the invention has been shown and described with some preferred embodiments thereof, it should be understood by those skilled in the art that various changes and omissions of the form and detail thereof may be made therein without departing from the spirit of the invention.

We claim:

1. A carburetor for use with a stratified-charged rotary piston engine, comprising a first supply system having an air flow passage, a throttle valve, a main fuel supply system and a main slow/idle fuel supply system, and a second supply system having an air flow passage and a throttle valve which is operationally co-related with the throttle valve in said first supply system, wherein the improvement comprises a second slow/idle fuel supply system provided in one of said first and second supply systems said second slow/idle fuel supply system having a control valve which selectively intercepts the flow of fuel through said second slow/idle fuel supply system, a first sensing means for sensing the speed condition of the engine, a second sensing means for sensing the temperature condition of the exhaust gas of the engine, and the control means for controlling said control valve depending upon the information received from said first and second sensing means in a manner such that the flow of fuel through said second slow/idle fuel supply system is intercepted when the engine speed is above a predetermined low level and the exhaust gas temperature is above a predetermined value.

2. The carburetor of claim 1, wherein said second slow/idle fuel supply system is incorporated in said first supply system.

3. The carburetor of claim 1, wherein said second slow/idle fuel supply system is incorporated in said second supply system.

4. The carburetor of claim 1, wherein said first sensing means is a means to detect the throttle opening of the carburetor.

5. The carburetor of claim 1, wherein said first sensing means is a means to detect the intake vacuum.

6. The carburetor of claim 1, wherein said second sensing means is a thermostat to detect the exhaust gas temperature of the engine.

7. The carburetor of claim 1, wherein said control valve is a solenoid valve electrically controlled by said control means.

* * * * *